(12) United States Patent
Bagley

(10) Patent No.: US 7,613,919 B2
(45) Date of Patent: Nov. 3, 2009

(54) SINGLE-USE PASSWORD AUTHENTICATION

(76) Inventor: Brian B. Bagley, 333 S. 300 East, St. George, UT (US) 84770

( * ) Notice: Subject to any disclaimer, the term of this patent is extended or adjusted under 35 U.S.C. 154(b) by 684 days.

(21) Appl. No.: 10/963,334

(22) Filed: Oct. 12, 2004

(65) Prior Publication Data

US 2006/0080545 A1 Apr. 13, 2006

(51) Int. Cl.
*H04L 9/00* (2006.01)
*H04L 9/32* (2006.01)
*H04K 1/00* (2006.01)
*G06F 7/58* (2006.01)
*G06F 15/16* (2006.01)

(52) U.S. Cl. .......................... 713/155; 713/182; 726/10
(58) Field of Classification Search ................ 713/183, 713/155; 726/10
See application file for complete search history.

(56) References Cited

U.S. PATENT DOCUMENTS

| 7,275,260 B2 * | 9/2007 | de Jong et al. ................ 726/10 |
| 2005/0120214 A1 * | 6/2005 | Yeates et al. ................ 713/171 |
| 2006/0053296 A1 * | 3/2006 | Busboom et al. ............ 713/182 |

FOREIGN PATENT DOCUMENTS

WO    WO 0186393 A2 *  11/2001

OTHER PUBLICATIONS

Stallings, William; Network Security Essentials 2nd Edition; Prentice Hall, Pearson Education Inc. 2002; pp. 92, 97, 98, 100, 164-166.*
Costa, D.; "Identity Crisis"; *PC Magazine*; Oct. 15, 2002; pp. 1-6.
Kanellos, M.; "VeriSign aims to filter out the fakes"; <http://msn-cnet.com.com/2100-7355_3-5163410.html> Published to web Feb. 23, 2004.
Krim, J.; "FCC Blocks Spam on Wireless Devices"; <http://wvvw.washingtonpost.com/ac2/wp-dyn/articles/A41009-2004Aug4> Published to web Aug. 5, 2004.
Sullivan, B.; "Study: ID theft usually an inside job"; <http://msnbc.msn.com/id/5015565/?GT1=3391> Published to web May 21, 2004.
Zoemail <http://www.zoemail.com/howitworks.htm> Retrieved from web Oct. 12, 2004.

* cited by examiner

*Primary Examiner*—Gilberto Barron, Jr.
*Assistant Examiner*—Virgil Herring
(74) *Attorney, Agent, or Firm*—Workman Nydegger

(57) ABSTRACT

Systems, computer program products and methods for authentication using a one-time password. In system that includes a client, a service provider, and an authentication service, the authentication service generates an authentication service identifier for the client. Any suitable identifier may be used for the authentication service identifier, which generally takes the form of an arbitrary number of characters. From the client, the authentication service receives a client moniker (e.g., a username) for the client to use when accessing the authentication service. The authentication service sends a one-time password to the client for the client to use in accessing the service provider. When the authentication service receives a one-time password from the service provider, the authentication service sends the authentication service identifier for the client to the service provider to authenticate the client if the one-time password received from the service provider matches the one-time password sent to the client.

29 Claims, 12 Drawing Sheets

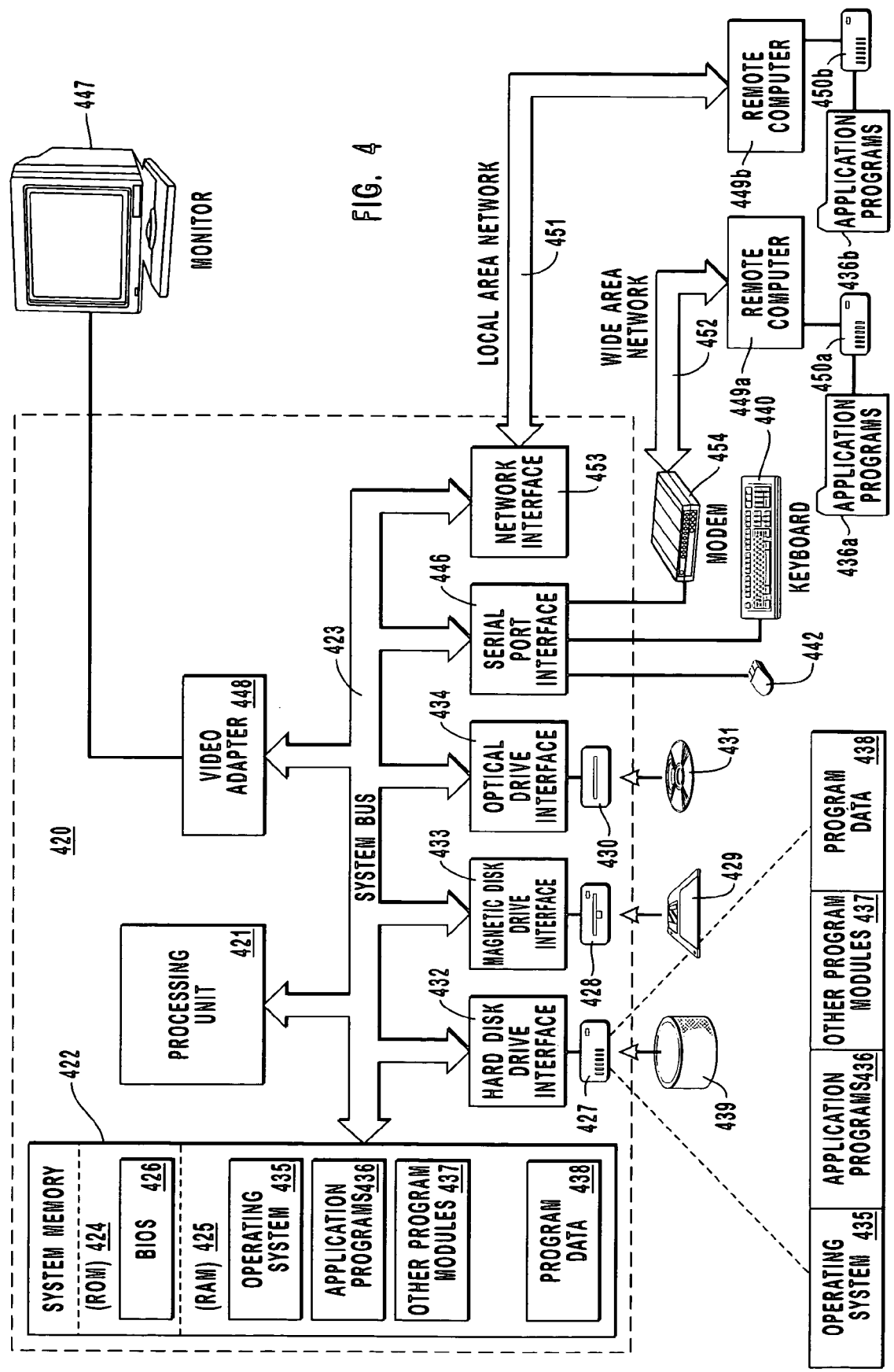

SINGLE-USE PASSWORD AUTHENTICATION

CROSS-REFERENCE TO RELATED APPLICATIONS

N/A

BACKGROUND OF THE INVENTION

1. The Field of the Invention

The present invention relates to authentication. More specifically, the present invention relates to authentication using a one-time password.

2. Background and Related Art

In general, authentication involves confirming or verifying a user's identity, as opposed to authorization, which typically involves determining and enforcing a user's access permissions. Usernames and/or passwords are perhaps the most familiar authentication scheme to many. Current username/password authentication, however, suffers from a number of significant drawbacks.

For example, username/password authentication is subject to eavesdropping and brute force attacks. Eavesdropping attacks typically involve rogue entities, such as rogue network devices or rogue operators of legitimate network devices, that read and analyze passing network traffic. When network traffic appears to contain username/password information (or for that matter any type of sensitive or personal information), the acquired information is logged for further analysis and/or future use.

Brute force attacks generally involve guessing passwords and/or usernames. Frequently, usernames for specific users are either known or can be inferred. For example, unlike passwords which tend to be somewhat more arbitrary, usernames frequently have a strong resemblance to a user's actual name, public information about the user, or common words. Usernames generally are not considered by most to be confidential. As a result, brute force attacks are generally directed to passwords for known usernames.

Strictly speaking, a brute force attack implies trying all possible permutations in guessing a username/password. For example, a brute force attack on a four-digit PIN involves trying all 10,000 permutations of four digits (i.e., 0000-9999). Because remembering arbitrary information can be difficult, users often choose passwords that have some meaning. So-called dictionary attacks involve trying a limited set of permutations, such as commonly used words or numbers.

To help protect again brute force attacks, organizations often impose standards on allowable passwords, in terms of length, types of characters, expiration, similarity to previously used passwords, etc. For example, compare the four-digit PIN described above (10,000 permutations) with a four-digit password selected from numbers, uppercase letters, lowercase letters, and symbols (millions of permutations).

A wide variety of information may be available to a successful attacker. Depending on the access permissions associated with a particular username, an attacker may be able to gain access to sensitive personal information, business information, and/or personal information of other users. Such information may be used in connection with identify theft, fraudulent purchases, corporate espionage, and the like.

In order to protect usernames/passwords (and other information) from attack, encryption or other cryptographic techniques frequently are used. Encryption may be categorized as either symmetric or asymmetric. In symmetric encryption, the same key is used for both encryption and decryption. In asymmetric encryption, different keys are used for encryption and decryption. Public key infrastructures (PKIs), using a public/private key pair and a digital certificate, are examples of asymmetric encryption. Information encrypted with the public key can only be decrypted with the corresponding private key, and vice-versa. Typically, the public/private key pair and digital certificate are used for authentication and for exchanging a symmetric key to encrypt future exchanges, since continued use of the public/private key pair imposes a significant processing overhead, as compared to symmetric encryption.

Digital certificates and private/public keys are relatively bulky, and as indicated above, impose a certain amount of processing overhead. Furthermore, it is often difficult to transfer digital certificates and private/public keys from one device to another, making them a somewhat less attractive option for mobile computing devices. Authenticating for remote access from a public or third-party computer may not be practical, either because the remote access was not anticipated beforehand, and therefore the digital certificate and corresponding public/private key pair are not available, or because the potential for compromising the public/private key pair is simply too high.

Generally, for a given encryption algorithm, encryption strength depends on the length of the encryption key. Smaller keys are relatively easier to break than larger keys. Theoretically, however, given enough computing resources and time, it is possible to break virtually any encryption key. As an added precaution, therefore, encryption keys may be rotated periodically, so that even if one key is broken, information encrypted with other keys is not compromised.

For maximum protection, key rotation may occur after each key use. Key rotation after each use may be referred to as one-time pad encryption or simply one-time keys or passwords. With one-time passwords, subsequent passwords have no relationship to prior passwords. As a result, breaking one password does not provide any insight into what subsequent passwords might be. Conventionally, one-time pads require both ends of a communication to use the same technology, so that key usage at both ends may be synchronized. Although offering a high degree of protection, one-time passwords traditionally have imposed too much of a burden for general usage by the public at large. Furthermore, for wide-spread use, all potential parties would need access to the one-time password technology, which means that a trust relationship would already need to exist between all potential parties or that one-time passwords could not be used, like digital certificates and public/private key pairs, for authenticating arbitrary parties.

With the tremendous growth of on-line services, many users maintain accounts at multiple service providers. For users, maintaining multiple accounts often leads to selection passwords that are more easily remembered, and therefore more easily attacked. Aside from security consequences, on-line service providers have begun to recognize that it is inconvenient for users to authenticate to each service provider separately. Consider, for example, a user signing-on to a user account for his or her personal computer, then signing-on to a user account for his or her Internet service provider, then signing-on to a user account for email access, then signing-on to a user account at an on-line retailer to make a purchase. In addition to the complexity imposed by keeping track of each username and password, the user experience of constantly signing-on can be a source of frustration for the user.

In order to simplify authentication, some on-line service providers participate in single sign-on arrangements. Briefly, single sign-on allows a user to authenticate with one service in order to access services at one or more affiliated providers.

Single sign-on effectively centralizes authentication within an authentication service. While perhaps improving the user experience, single sign-on also introduces a new risk. Because the authentication service maintains credentials (usernames, passwords, etc.) for a large number of users and potentially contains other personal, private, or secret information, the service is an attractive target for attackers, particularly in terms of exploiting any security vulnerabilities the authentication service has overlook or failed to appreciate. Accordingly, a relatively increased level of hostile resources may be focused on the authentication service, since if successful, an attack is likely to yield information about a comparatively large number of users.

As a result, methods, systems, and computer program products are desired that provide the benefits of one-time passwords for authentication, without requiring a trust relationship to exist between the authenticating party and the service requiring the party to authenticate, so as to facilitate wide-spread use and adoption among arbitrary parties. Furthermore, it is also desired to limit the authentication credentials that are stored by any one service so that even if a security breach occurs, only a portion of the authentication credentials needed to authenticate a user are at risk.

BRIEF SUMMARY OF THE INVENTION

The present invention relates to systems, computer program products and methods for authentication using a one-time password (a proxy password, also known as a "token"). In an example embodiment that includes a client, a service provider, and an authentication service, the authentication service receives from the client a personal moniker, or a username of sorts for the authentication service, which is ideally the client's everyday preferred "password" known only to themselves. The authentication service generates an authentication service identifier for the client, and sends to the client a one-time password. Accordingly, the moniker can be viewed as a proxy password used to obtain a one-time password for authentication. This identifier and the one-time password are then temporarily associated by the authentication service. Any suitable identifier may be used for the authentication service identifier, which generally takes the form of an arbitrary number of characters, and may be generated algorithmically or may be produced in some other manner. The client then sends the one-time password provided by the authentication service to the service provider. The service provider then sends the same one-time password to the authentication service. Upon receiving a one-time password from the service provider, the authentication service sends to the service provider the authentication service identifier that is associated with the one-time password for this one time.

The foregoing operations may be part of a larger interaction between the client, service provider, and authentication service. For example, the client may be registering with the service provider for the first time in order to associate the authentication service provider identifier with a service provider identifier for the client. Similarly, one service provider may verify certain client information to another service provider. A portion of the communication between client, service provider, and authentication service may be encrypted or otherwise occur over a secure connection. Interaction between the client, the service provider, and the authentication service may occur by telephone and/or over a computer network.

One-time passwords may be selected from a list of random numbers, may be generated algorithmically, or may be produced in some other manner. The authentication service may discard the one-time password send to the client once it has been matched to the one-time password received from the service provider. Alternatively, the one-time password may expire. In either case, limiting the lifetime of one-time passwords may reduce the likelihood of the one-time passwords being compromised.

The authentication service may generate the authentication service identifier for the client as part of a registration operation in which the authentication service receives the client moniker from the client through a trusted entity that verifies the client's identity based on some agreed upon criteria. The criteria may be relatively simple or relatively complex, depending on the particular implementation. For example, the criteria may include using picture identification, personal knowledge, biometrics, possession of certain information, authentication by a third party, and so forth. As described in more detail below, authentication may be in connection with financial transactions, voting, activating or verifying a credit card, a subscription to an information service, a protected file protocol, logon passwords, e-mail filtering, access to vaults or vehicles, access to buildings or venues, generalized or specific computing resources or services, or any other circumstance where authentication or limiting access is of interest.

In another example embodiment, also including a client, a service provider, and an authentication service, the service provider associates an authentication service identifier for the client with a service provider identifier for the client. The service provider receives both the service provider identifier and a one-time password from the client to use in authenticating the client through the authentication service. The service provider verifies that the service provider identifier for the client represents a valid service provider identifier. The service provider then sends the one-time password to the authentication service so that the authentication service can determine if an authentication service identifier for the client is associated with the one-time password at the authentication service, and if so, to be sent to the service provider. If the identifier received from the authentication service matches a registered authentication service identifier for the client, and is associated with the service provider identifier for the client at the service provider, then the service provider allows the client access to one or more services offered by the service provider.

In yet another example embodiment with a client, a service provider, and an authentication service, the client sends a client moniker to the authentication service and receives a one-time password that is associated with an authentication service identifier for the client to use in accessing the service provider. To the service provider, the client sends a service provider identifier for the client so that the service provider can locate the authentication service identifier for the client that is associated with the service provider identifier for the client at the service provider. The client also sends the one-time password to the service provider so that the service provider can send the one-time password to the authentication service, receive the authentication service identifier for the client that is associated with the one-time password from the authentication service. The authentication service identifier for the client that is received from the authentication service is then matched with the registered authentication service identifier for the client that is associated with the service provider identifier for the client at the service provider.

Additional features and advantages of the invention will be set forth in the description which follows, and in part will be obvious from the description, or may be learned by practicing of the invention. The features and advantages of the invention may be realized and obtained by means of the instruments and combinations particularly pointed out in the appended claims. These and other features of the present invention will become more fully apparent from the following description and appended claims, or may be learned by the practicing the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which:

FIG. 4 illustrates an example system that provides a suitable operating environment for the present invention.

DETAILED DESCRIPTION OF THE PREFERRED EMBODIMENTS

Figure 1A:
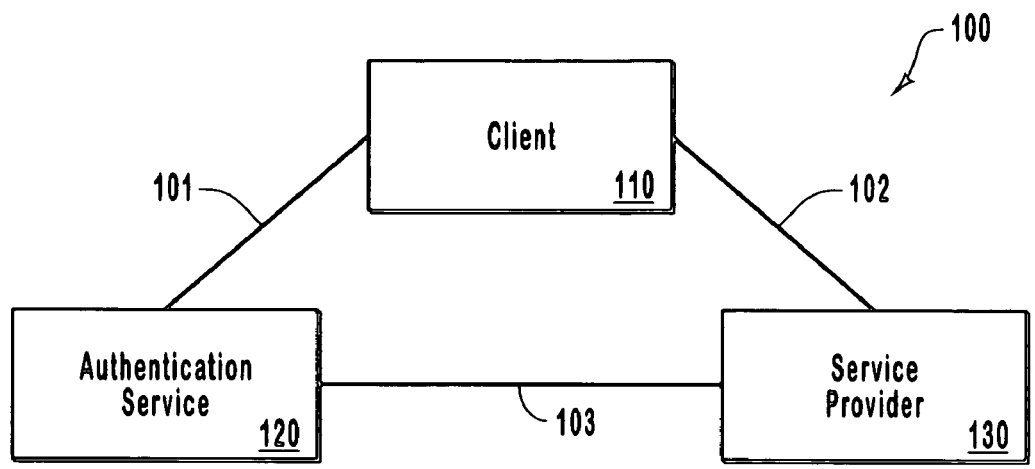
FIGS. 1A-1B illustrate potential participants for example embodiments of authentication using a one-time password in accordance with the present invention.

The present invention extends to methods, systems, and computer program products for one-time password authentication. This one-time password authentication is analogous to one-time pads used for encryption purposes, where two parties share a pad of codes and agree to advance to the next code after each use, which historically has been considered unbreakable.

As described in greater detail below, embodiments of the invention offer a remote access/authentication technique using a centralized authentication service that issues one-time passwords to clients based on a received client moniker. The one-time passwords are accepted by entities requiring authentication and then redeemed at the centralized authentication service for an identification string (e.g. a lengthy set of characters associated with the one-time password when the one-time password is issued). The authentication service identifier can then be matched to a previously received authentication service identifier and other identifying information at the authenticating entity or service provider.

When using this remote access/authentication technique, the participants or parties do not need to share information with each other that later could be used to compromise the authentication process. In particular, the client need know only the one-time password and where it can be used; the centralized authentication service need know only the one-time password and the identification string (i.e., the authentication service identifier); and the authenticating entity or service provider need know only the identification string and other identifying information for the client (e.g., username, etc.), but not the client moniker used to generate the one-time password at the authentication service.

Among other things, embodiments of the invention allow for clients to use a moniker or proxy password for an indefinite period of time, perhaps for life, because the moniker is not disclosed to any services other than the authentication service. Accordingly, there is no need for clients to possess biometric, smart cards or other intelligent devices, or service provider specific passwords that can be forgotten, stolen, or confused with other passwords. These embodiments centralize strong authentication and offer service providers one-stop, on-demand, authentication, without requiring any additional agreements between clients and the service providers, and without imposing other significant barriers.

As will be appreciated from the further description that follows, embodiments of the invention can be used in a wide variety of circumstances, including the following examples.

Unsolicited email and viruses can be reduced by requiring a one-time password to be included with a received email to confirm the identity of the sender and/or show that the sender went through the effort to obtain a one-time password for the message.

Internet voting can be implemented through a registration process in which the authentication service identifier for a client is first verified by voting officials in person. Only the registered client can access a ballot, and then access is allowed only once.

Data encryption and decryption using the authentication service identifier.

A third party can verify the identity of a client to a fourth party. For example, a trusted and known third party, such as a driver's license bureau, can be contacted by the authentication service to verify the client's identity and other information for purposes of client registration with a fourth party service provider (e.g., verifying the client's age).

A phone registration procedure can be used to secure future use of credit cards. By registering a card number with an online vendor over the phone with a one-time password, which gives the online vendor the authentication service identifier for the client, only the registrant will be able to use the card for purchases. This process also could be adopted by card-issuers to discourage identity theft involving credit cards.

Electronic files and data can be protected. For example, the authentication service identifier for a client can be used to encrypt the electronic file or data. Decryption then requires a one-time password from the client to be used in retrieving the appropriate authentication service identifier from the authentication service.

Physical access to vaults, vehicles, venues, buildings, etc. can be regulated where metal keys, electronic keys, one's age, or personal identification is required for entry or access. For example, a cell phone could be used to obtain a one-time password, which is then entered into network device to be verified with the authentication service for the client.

The embodiments of the present invention may comprise one or more special purpose and/or one or more general purpose computers including various computer hardware, as discussed in greater detail below in connection with FIG. 4.

FIG. 1A illustrates example participants for one embodiment of authentication using a one-time password in accordance with the present invention. The one-time password authentication process for the example participants shown in FIG. 1A is described in more detail below in connection with FIGS. 2A-2E. FIG. 1A shows an environment 100 that includes a client 110, an authentication service 120, and a service provider 130, interconnected with communication links 101, 102, and 103.

Communication links 101, 102, and 103 are illustrated with direct lines connecting client 110, authentication service 120, and service provider 130 merely to indicate that a communication link, at least temporarily, may exist between participants and not to indicate any particular communication topology, infrastructure, or protocol, any of which may or may not include one or more intermediaries. Accordingly, communication links 101, 102, and 103 may comprise any suitable connection for exchanging information, including telephone and computer networks for both voice and data. Depending on the embodiment, communication links 101, 102, and 103 may be encrypted or secure for at least some communication.

Figure 1B:
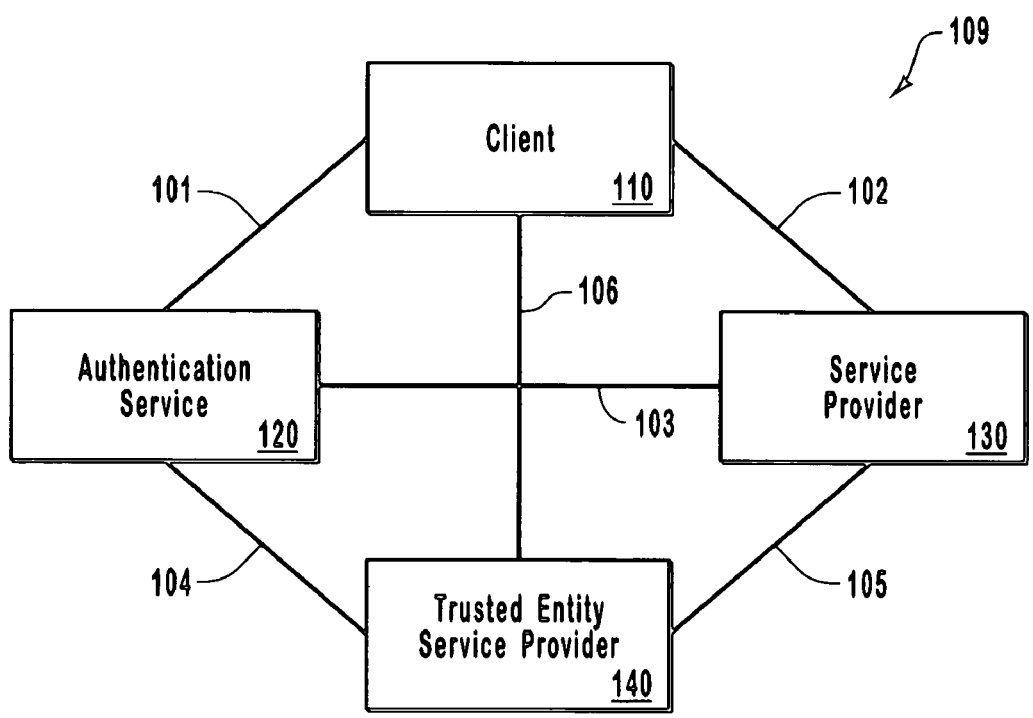
Figure 2A:
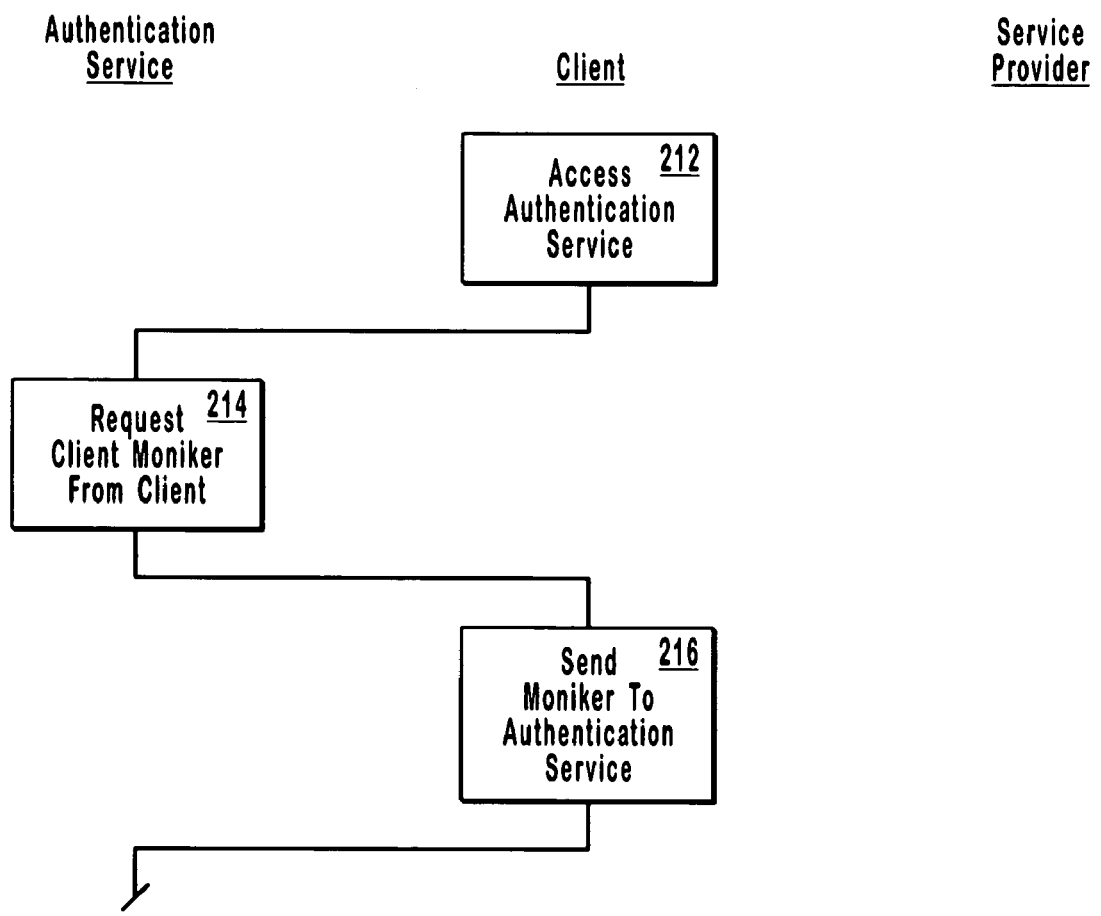
FIGS. 2A-2E show a flow chart for an example embodiment of one-time password authentication in accordance with the present invention.
Figure 2B:
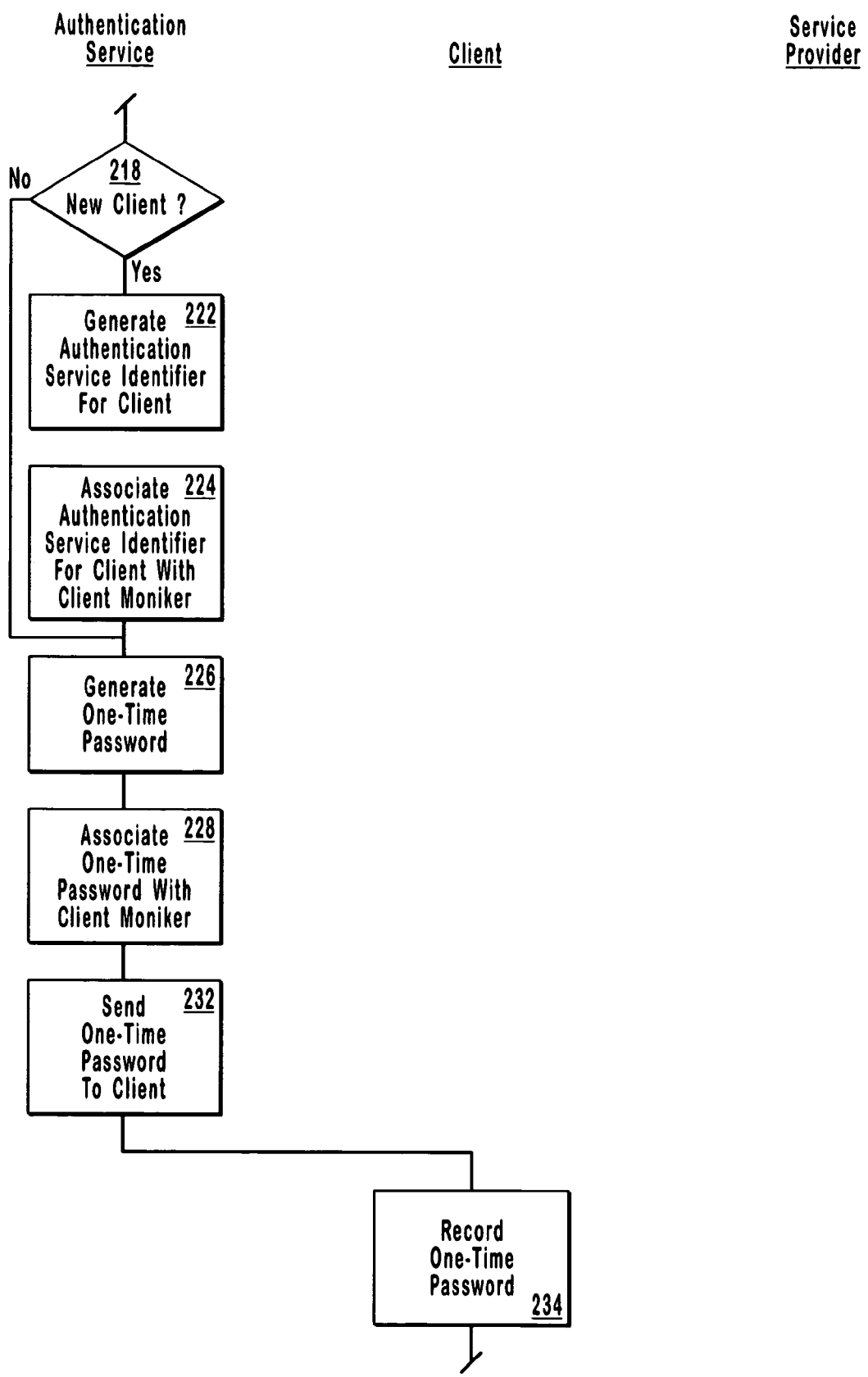
Figure 2C:
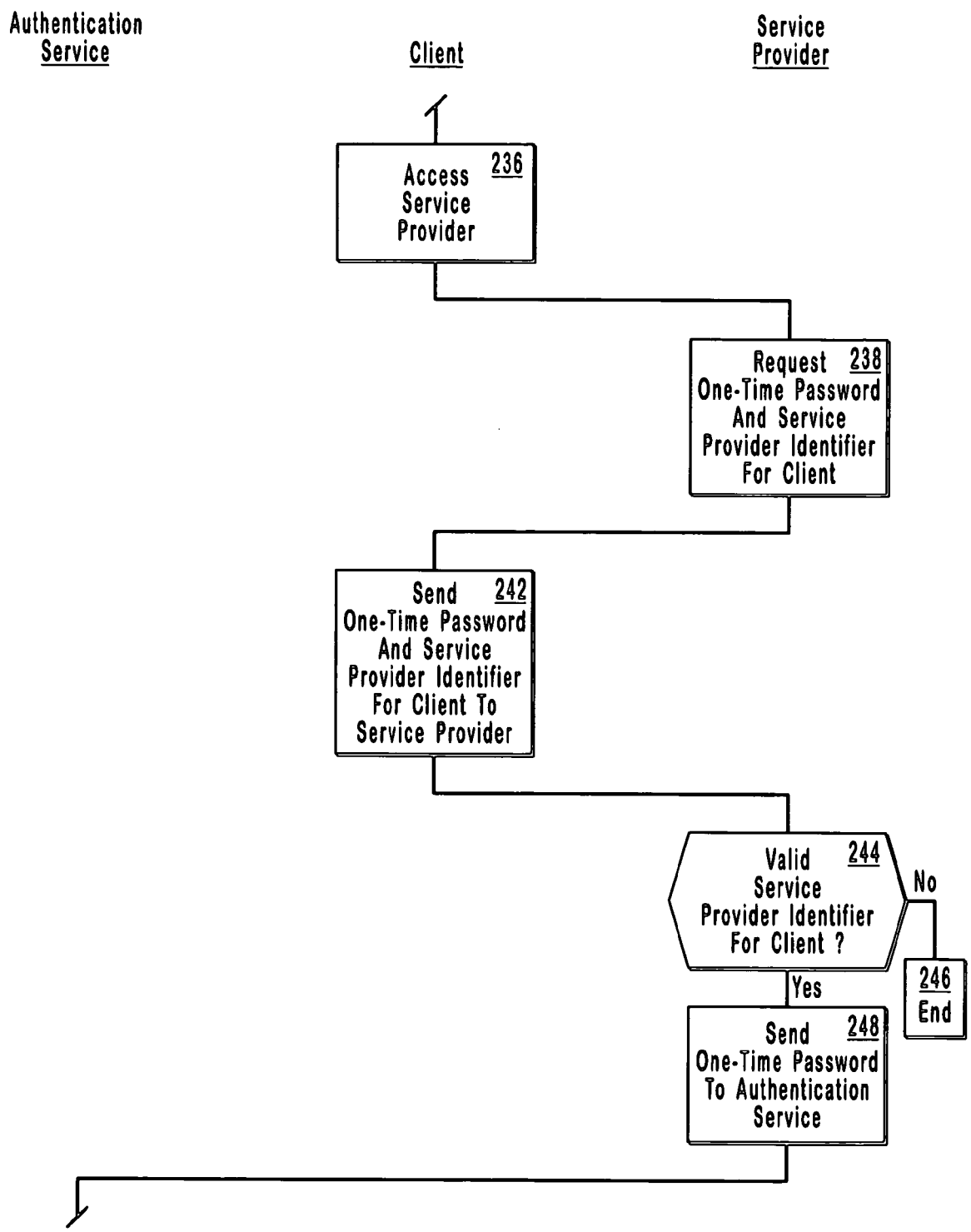
Figure 2D:
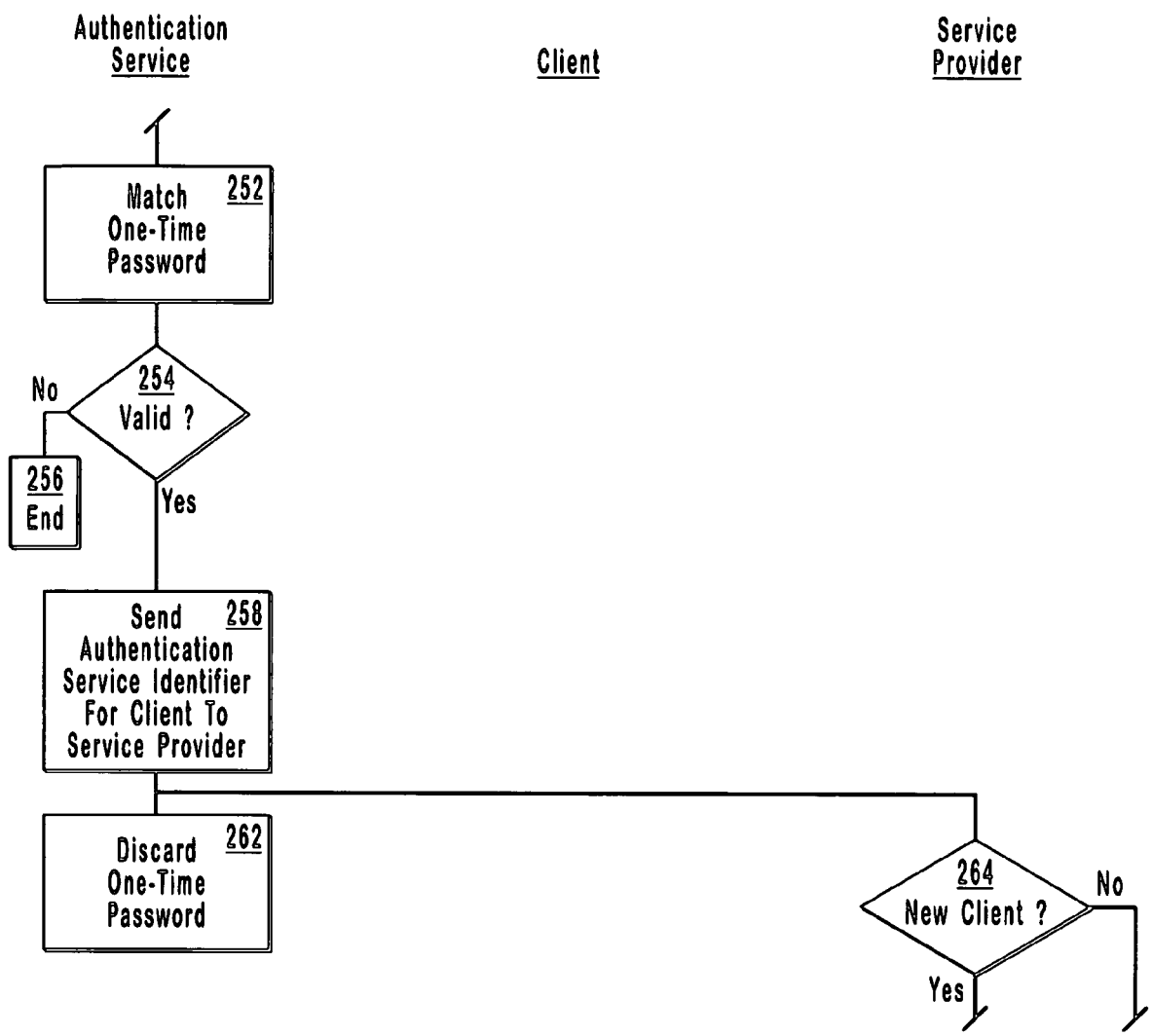
Figure 2E:
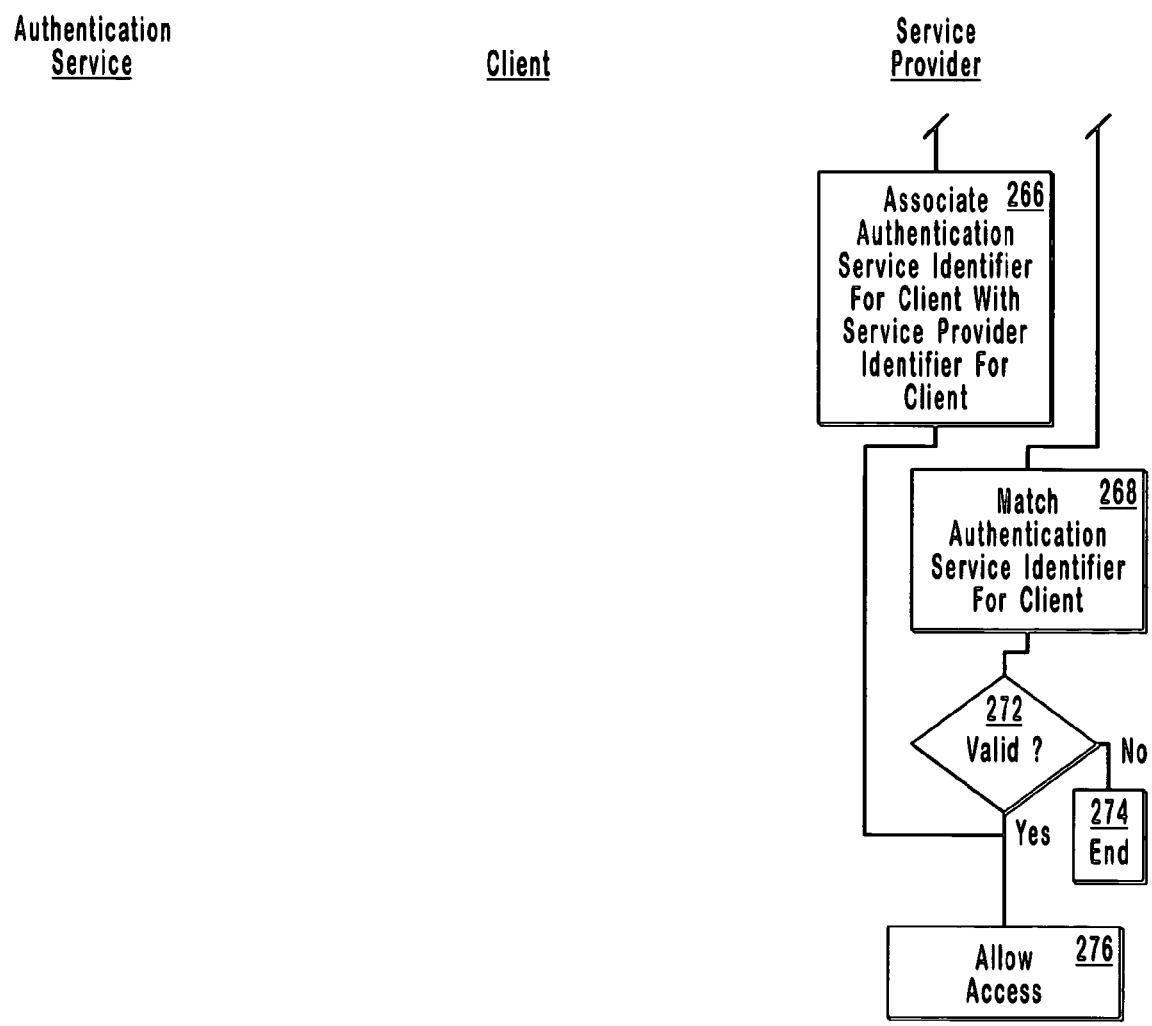
Figure 3A:
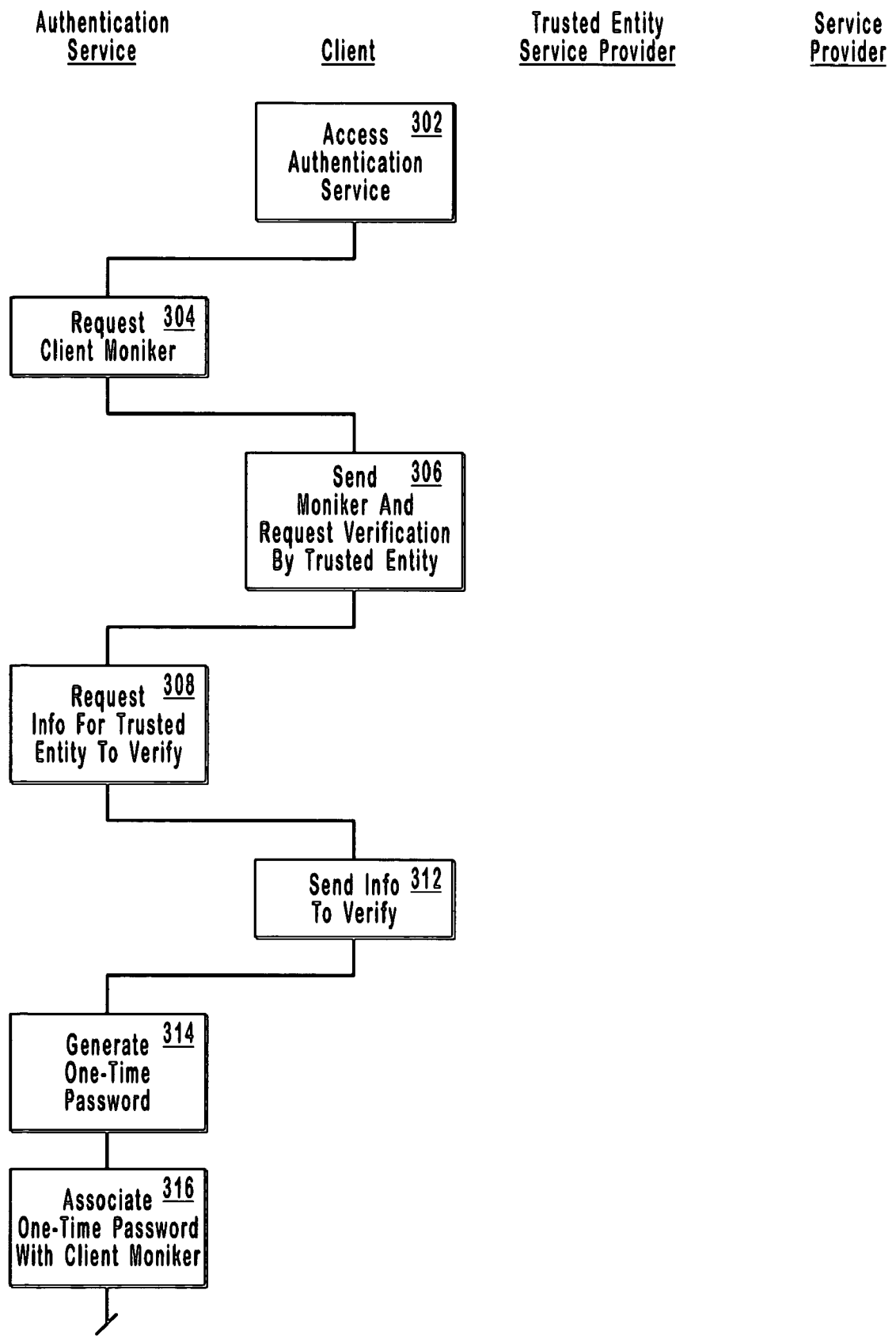
FIGS. 3A-3E show a flow chart for an example embodiment of one-time password authentication in which certain client information is verified by a trusted entity.
Figure 3B:
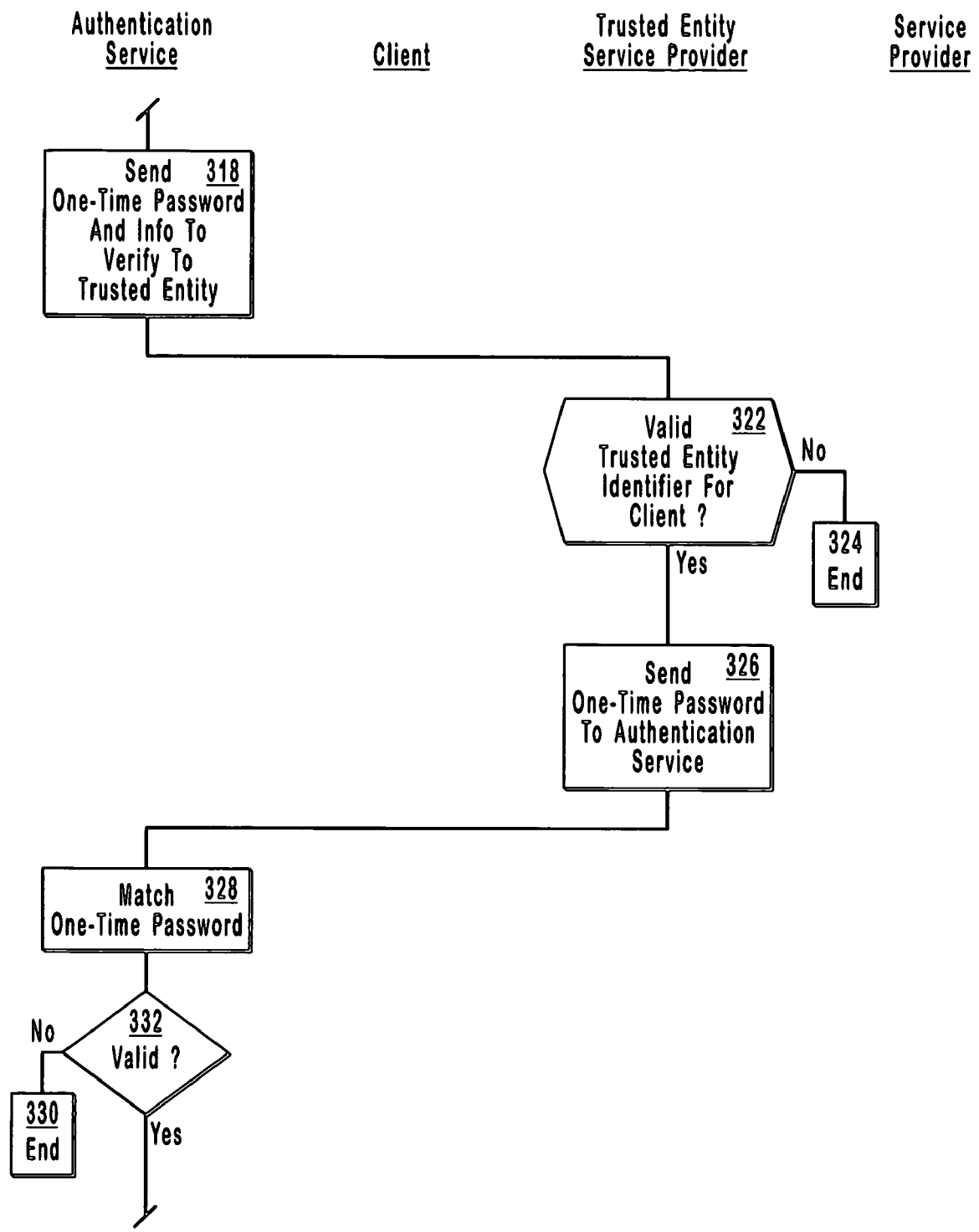
Figure 3C:
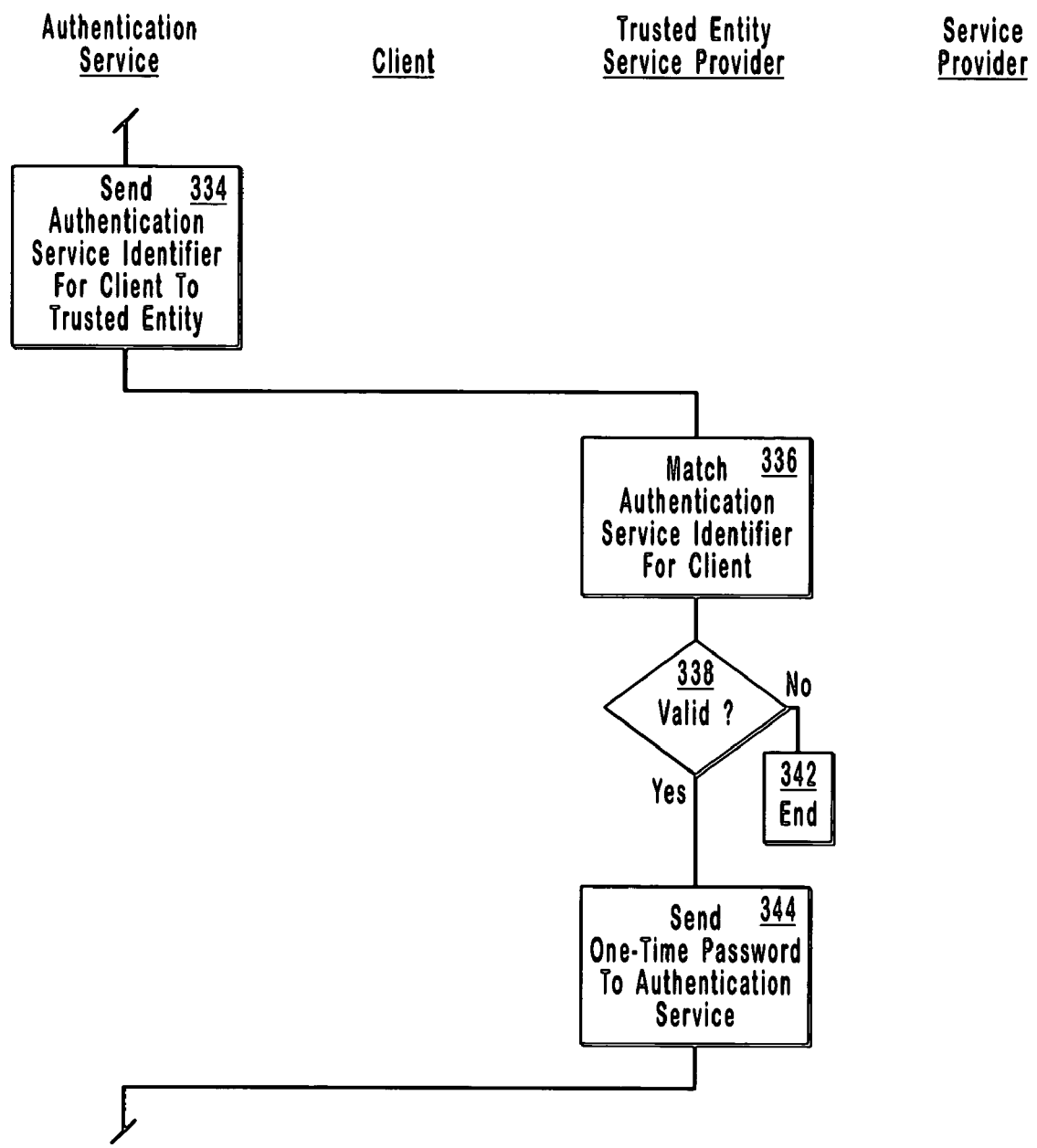
Figure 3D:
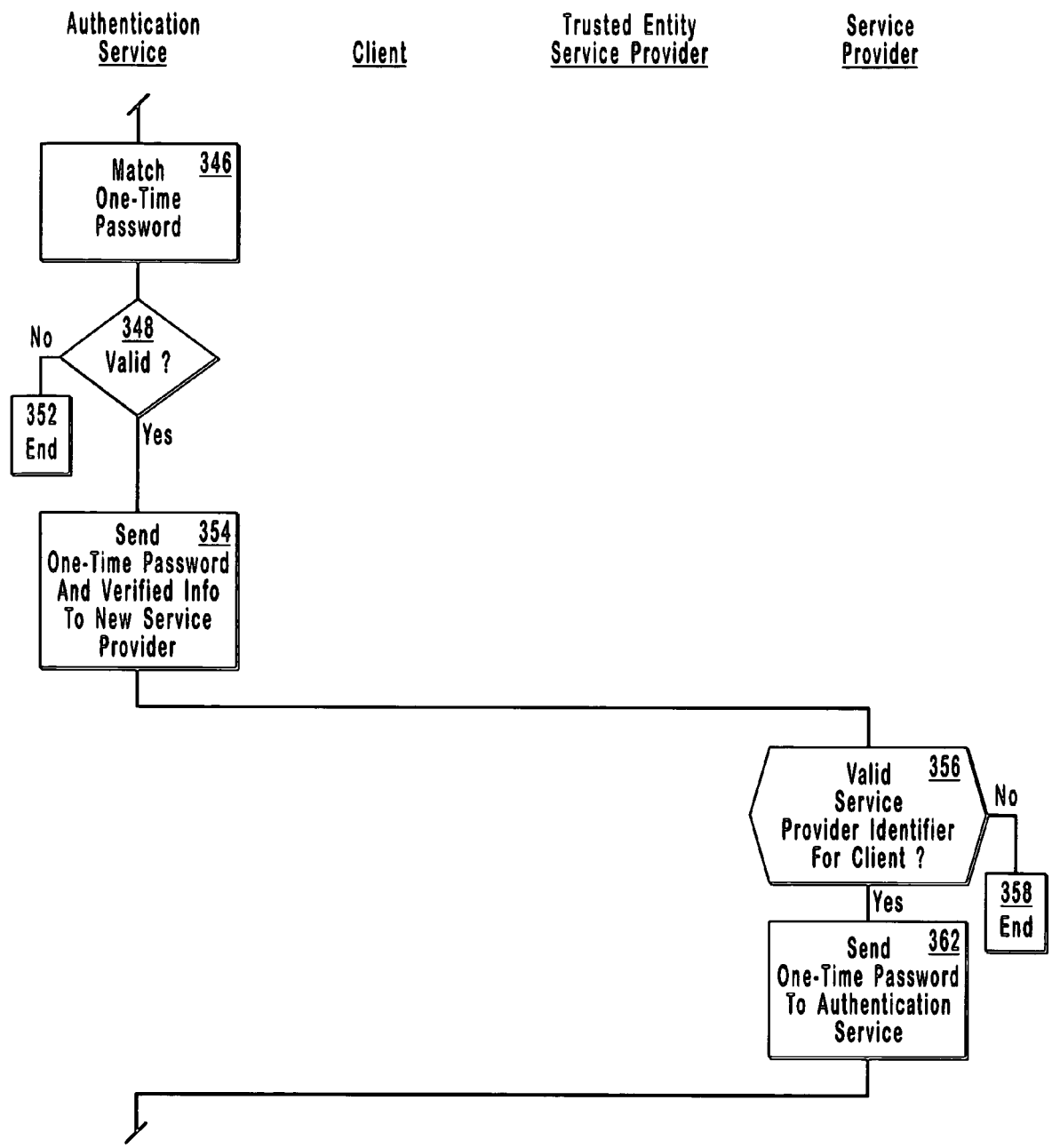
Figure 3E:
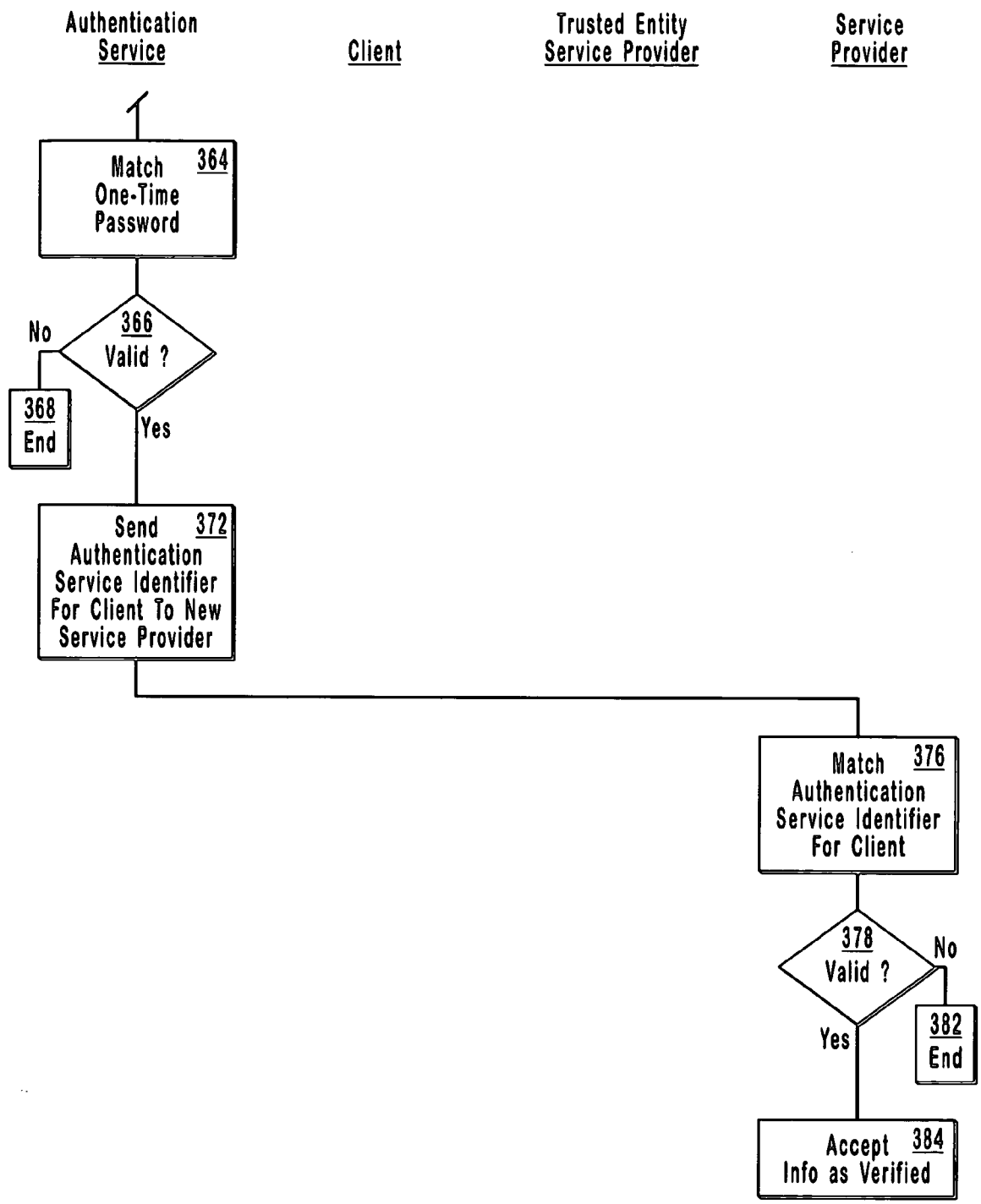

FIG. 1B illustrates example participants for another embodiment of authentication using a one-time password in accordance with the present invention. The one-time password authentication process for the example participants shown in FIG. 1B is described in more detail below in connection with FIGS. 3A-3E. FIG. 1B shows an environment 109 that includes a client 110, an authentication service 120, a service provider 130, and a trusted entity service provider 140, interconnected with communication links 101, 102, 103, 104, 105, and 106.

Similar to FIG. 1A, communication links 101, 102, 103, 104, 105, and 106 are illustrated with direct lines connecting client 110, authentication service 120, service provider 130, and trusted entity service provider 140 merely to indicate an that a communication link, at least temporarily, may exist between participants and not to indicate any particular communication topology, infrastructure, or protocol, any of which may or may not include one or more intermediaries. Accordingly, like FIG. 1A above, communication links 101, 102, 103, 104, 105, and 106 may comprise any suitable connection for exchanging information, including telephone and computer networks for both voice and data. Depending on the embodiment, communication links 101, 102, 103, 104, 105, and 106 may be encrypted or secure for at least some communication.

Service provider 130 may provide a wide range of services, such as financial transactions, voting, activating a credit card, a subscription to an information service, a protected file protocol, logon passwords, other generalized or specific computing resources or services, and the like. Client 110 desires access to one or more of the services provided by service provider 130. It should be appreciated that the labels "client" and "service" indicate a particular relationship between participants at a specific time. In general, a client requests or accesses, and a service responds or provides. A client in one operation therefore, may be or act as a service in another operation, and vice-versa. Furthermore, as used in this application, client should be interpreted broadly to encompass both human users and computing devices.

As described in more detail below, authentication service 120 provides one-time passwords for client 110 to use when authenticating to service provider 130. Authentication service 120 also confirms that a one-time password received from service provider 130 corresponds to client 110. Trusted entity service provider 140 can be used to verify or certify information regarding client 110 to another service, such as service provider 130. Similar to its interaction with service provider 130, authentication service 120 confirms that a one-time password received from trusted entity service provider 140 corresponds to client 110.

FIGS. 2A-2E show a flow chart for an example embodiment of one-time password authentication in accordance with the present invention. As indicated above, the flow chart of FIGS. 2A-2E corresponds to the environment 100 illustrated in FIG. 1A. Although processing or operations for example embodiments may be described or claimed in a particular order, the present invention is not necessarily limited to any particular ordering or combination.

The client accesses (212) the authentication service in order to obtain a one-time password. The authentication service requests (214) a client moniker or proxy password from the client. The client moniker identifies the client to the authentication service and is analogous to a username. In response, the client sends (216) the client moniker to the authentication service. Of course, the client could have sent the client moniker with the initial access to simplify interaction with the authentication service. In some embodiments, a password, personal identification number (PIN), or other information may be used to distinguish between identical client monikers used by different clients.

Upon receiving a client moniker from the client, the authentication service determines (218) whether the client is a new or existing client. For new clients, the authentication service generates (222) an authentication service identifier for the client and associates (224) the authentication service identifier for the client with the client moniker. Any suitable identifier may be used for the authentication service identifier, which generally takes the form of an arbitrary number of characters, such as, for example, a globally unique identifier (GUID). The authentication service identifier could be generated algorithmically from the client moniker so that the client moniker does not need to be stored by the authentication service or may be a random number that is generated in a manner similar to one-time passwords as described below. If the client moniker is random, then it is stored with the authentication service identifier is a secure manner to prevent others from learning about the association. For existing clients, generating an authentication service identifier for the client and associating the authentication service identifier with the client moniker are skipped since they generally are performed only once.

The authentication service generates (226) a one-time password for the client. One-time password generation may take a variety of forms. For example, the one-time password may be generated by selecting a random number from a list of random numbers. Such random number lists can be generated by digitizing output from a random source, such as background electrical or audio signals (noise) from space, a power transformer, and so forth. Alternatively, the one-time password may be generated using a random number generator that is based on an algorithm.

Once the one-time password has been generated, the authentication service associates (228) the one time password with the client moniker and/or authentication service identifier and sends (232) the one-time password to the client. The client records (234) the one-time password for use when accessing the service provider. For example, a user could write the one-time password down on a piece of paper, manually copy the one-time password into a buffer, automatically store the one-time password in memory, etc.

Having obtained the one-time password, the client accesses (236) the service provider. In response to the client access, the service provider requests (238) the one-time password from the client, and at the same time requests a service provider identifier for the client. The service provider identifier for the client is analogous to a client username that identifies a particular client to the service provider. Upon receiving the request, the client sends (242) the one-time password and service provider identifier for the client to the service provider. Here too, the client could have sent the one-time password and service provider identifier for the client with the initial access to simplify interaction with the service provider.

The service provider first checks (244) that the service provider identifier for the client is valid. If not, processing ends (246) because the client is not known to the service provider. Alternatively, the service provider could continue at this point by creating a new account or registration for the client. If a valid service provider identifier is received for the client, the service provider sends (248) the one-time password received from the client to the authentication service.

The authentication service matches (252) the one-time password received from the service provider to one-time passwords that the authentication service considers valid. If the authentication service determines (254) that the received one-time password is not valid, processing ends (256). Among other things, ending further processing helps guard against attacks, such as denial-of-service attacks that attempt to swamp the authentication service with bogus authentication requests or brute force attacks aimed at guessing one-time passwords.

For a valid one-time password, the authentication service sends (258) the authentication service identifier for the client to the service provider and discards (262) the one-time password so that it is no longer valid. One-time passwords also may have expirations to limit the amount of time they are valid. As a result, one-time passwords may be valid for relatively short periods of time or relatively long periods of time, depending on the needs and preferences of a particular implementation. Relatively short-lived one-time passwords enhance security because the window of time a hacker has to comprise the authentication service and gain any potentially useful information is reduced.

Upon receiving the authentication service identifier for the client, the service provider determines (264) if the authentication service identifier is for a new client. If so, the service provider associates (266) the authentication service identifier for the client with the service provider identifier for the client and allows (276) access. For an existing client, the service provider matches (268) the authentication service identifier for the client that is received (e.g., 258) from the authentication service with an authentication service identifier that the service provider previously associated (e.g., 266) with the service provider identifier for the client. If the authentication service identifier is valid (272), the service provider allows (276) access. Otherwise, processing ends (274).

At this stage it should be appreciated that even if the authentication service is compromised, relatively little information is at risk. The authentication service stores client monikers, one-time passwords, and authentication service identifiers for clients. With a client moniker, a hacker could obtain one-time passwords for a client. But, the hacker would not know which service providers the client accesses, and even if the hacker knew or suspected a particular service provider, the hacker could not get the service provider identifier for the client from breaking into the authentication service. Similarly, compromising the service provider would only reveal a service provider identifier for the client and an authentication service identifier for the client. Without the client moniker, the hacker would not be able to generate one-time passwords to gain access to the service provider. Interestingly, in this embodiment the service provider does not even store passwords for a client, reducing the likelihood of a security breach at the service provider.

Having described the Figures generally, FIGS. 2A-2E are now described briefly in the context of a specific example in which the service provider is a fee-based information service. The example uses "BBagley" as a client moniker, "OTPW1" as a one-time password, "xy8923a" as an authentication service identifier for BBagley, and "BrianB" as a service provider identifier for the client. (Note that BBagley as a client moniker and BrianB as a service provider identifier for the client were selected to simplify the discussion. In most circumstances, client monikers and service provider identifiers that are more arbitrary, and therefore difficult to guess or infer, are preferred.) At 216, the client provides the moniker BBagley to the authentication service. BBagley is an existing client, so the authentication service generates (226) a one-time password OTPW1, associates (228) the one-time password with BBagley and/or BBagley's authentication service identifier xy8923a, and sends (232) the one-time password to the client.

At 242, the client sends the one-time password, OTPW1, and the service provider identifier for the client, BrianB, to the service provider. The service provider verifies (244) that BrianB is a valid service provider identifier and sends the one-time password OTPW1 to the authentication service. The authentication service matches (252) the one-time password and sends (258) the authentication service identifier for the client, xy8923a, to the service provider. Because BrianB is an existing client, the service provider matches (268) the received authentication service identifier xy8923a with an authentication service identifier for BrianB that was received previously, such as during an initial interaction to create an account for or register BrianB. At 276, the service provider allows access to the fee-based information service.

The processing described in connection with FIGS. 2A-2E can be used in a variety of circumstances, such as in an example file protection protocol embodiment. For clarity, this example embodiment, as well as others, are described in an abbreviated fashion, without reference to each an every operation described above in connection with FIGS. 2A-2E. The client accesses (212) and sends (216) the client moniker to the authentication service. Upon receiving a client moniker from the client, the authentication service generates (226) a one-time password for the client, associates (228) the one time password with the client moniker and/or authentication service identifier for the client, and sends (232) the one-time password to the client to be recorded (234).

Having obtained the one-time password, the client accesses (236) a password file. In response to the client access, the file protection protocol (i.e., service provider) requests (238) the one-time password from the client. Upon receiving the request, the client sends (242) the one-time password to the file protection protocol, which in turn sends (248) the one-time password to the authentication service. The authentication service matches (252) the one-time password received from the file protection protocol to one-time passwords that the authentication service considers valid and sends (258) the authentication service identifier for the client to the file protection protocol.

After receiving the authentication service identifier for the client, the file protection protocol matches (268) the authentication service identifier for the client against a database of authentication service identifiers. The database of authentication service identifiers could be created as described above in connection with FIGS. 2A-2E for a plurality of clients. If the authentication service identifier for the client matches a valid (272) database entry, the file protection protocol allows (276) access. Note that for the file protection protocol, the service provider could be implemented at the client or separately. Accordingly, the service provider, client, and authentication service need not necessarily be implemented on separate machines.

Similarly, in an example logon password embodiment for a computer system, the client accesses (212) and sends (216) the client moniker to the authentication service. Upon receiving a client moniker from the client, the authentication service generates (226) a one-time password for the client, associates (228) the one time password with the client moniker and/or authentication service identifier for the client, and sends (232) the one-time password to the client to be recorded (234).

Having obtained the one-time password, the client accesses (236) the logon service for the computer system. In response to the client access, the logon service requests (238) the one-time password from the client. Upon receiving the request, the client sends (242) the one-time password to the logon service, which in turn sends (248) the one-time password to the authentication service. The authentication service matches (252) the one-time password received from the logon service to one-time passwords that the authentication service considers valid and sends (258) the authentication service identifier for the client to the logon service.

After receiving the authentication service identifier for the client, the logon service matches (268) the authentication service identifier for the client against a database of authentication service identifiers. Like the database of authentication service identifiers described above in connection with the file protection protocol, the database of authentication service identifiers for clients could be created as described in connection with FIGS. 2A-2E for a plurality of clients. If the authentication service identifier for the client matches a valid (272) database entry, the logon service allows (276) access.

In an example voting embodiment, the client may register to vote electronically with an appropriate government entity. The registration process could include verifying the identity of the client, such as by having the client present physical credentials in person, electronic credentials from a remote location, etc., and then having the client access (212) an approved authentication service. The authentication service requests (214) a client moniker from the client.

It should be appreciated that various related or unrelated authentication services may operate simultaneously. Accordingly, the client may have monikers for obtaining one-time passwords from multiple authentication services. Like one-time passwords, client monikers may expire as well to enhance security. In a voting context, the expiration could be set such that the client moniker is valid only for a single election. Alternatively, the voting service could be configured to issue and/or verify only a single one-time password during any given election.

The client sends (216) the client moniker to the authentication service. Upon receiving a client moniker from the client, the authentication service generates (226) a one-time password for the client, associates (228) the one time password with the client moniker and/or authentication service identifier for the client, and sends (232) the one-time password to the client to be recorded (234). The authentication service identifier for the client may be generated (222) and associated (224) with the client moniker at this time. Having obtained the one-time password, the client accesses (236) the voting service provider.

In response to the client access, the voting service provider requests (238) the one-time password and a voting service provider identifier from the client. The voting service provider identifier for the client could be established during the registration process with the appropriate government entity. As a security measure, the voting service provider identifier also may expire such that it is only valid for a single election. Expiration of the voting service provider identifier for the client may be in connection with or in place of expiration of the client moniker. Of course, a variety of other steps may be taken to assure that the client only votes once, and to maintain the integrity of electronic voting from election to election.

Upon receiving the request, the client sends (242) the one-time password and voting service provider identifier for the client to the voting service provider, which in turn sends (248) the one-time password to the authentication service. The authentication service matches (252) the one-time password received from the voting service provider to one-time passwords that the authentication service considers valid and sends (258) the authentication service identifier for the client to the voting service provider.

After receiving the authentication service identifier for the client, the voting service provider matches (268) the authentication service identifier for the client against a previously received authentication service identifier for the client, such as one received during the registration process with the appropriate government entity. If the authentication service identifier for the client matches (272), the voting service provider allows (276) access, and therefore the client is allowed to vote.

In an example telephone registration embodiment, such as for registering a credit card, the client accesses (212) and sends (216) the client moniker to the authentication service twice, to obtain two one-time passwords. (As an added security measure, the number of one-time passwords that may be valid simultaneously for any particular client may be limited in order to prevent denial-of-service attacks in which many one-time passwords are generated maliciously for a single client in a short period of time. Accordingly, the client may need to obtain and use the one-time passwords one at a time, rather than simultaneously.) Upon receiving the client moniker from the client, the authentication service generates (226) a one-time password for the client, associates (228) the one time password with the client moniker and/or authentication service identifier for the client, and sends (232) the one-time password to the client to be recorded (234).

At this stage, the client accesses the credit card registration service provider for registration instructions. In this example embodiment, the instructions include a telephone registration component. The client calls a toll-free number, and gives the credit card number and a one-time password by voice or telephone keypad to the credit card registration service. The credit card registration service sends (248) the one-time password to the authentication service. The authentication service matches (252) the one-time password received from the credit card registration service to one-time password that the authentication service considers valid and sends (258) the authentication service identifier for the client to the credit card registration service. The credit card registration service logs the authentication service identifier for the client with the credit card.

Next, the client accesses (236) the credit card registration service again, such as through the credit card service's World Wide Web site. In response to the client access, the logon service requests (238) another one-time password and certain registration information from the client, such as name on the credit card. Some of the requested registration information may be known to the credit card registration service, and therefore operate as a security check, and other information may be gathered for the first time. Upon receiving the request, the client sends (242) the identifying information the other one-time password to the credit card registration service, which sends (248) the other one-time password to the authentication service. The authentication service matches (252) the one-time password received from the credit card registration service to one-time password that the authentication service considers valid (note that since the first one-time password has been used, it is not longer valid) and sends (258) the authentication service identifier for the client to the credit card registration service.

After receiving the authentication service identifier for the client, the credit card registration service matches (268) the authentication service identifier for the client against previously received authentication service identifier for the client. If the received authentication service identifier for the client matches the previously received authentication service identifier for the client, i.e., is valid (272), the logon service allows (276) access, such as by associating the new registration information provided by the client, registering the credit card for use, etc.

In an example email embodiment, a one-time password can be used as a type of postage stamp, in effect validating the email as coming from a single-user who went through the effort to obtain the one-time password. Since most bulk email senders are unlikely to go through the extra effort of obtaining a one-time password, a requirement that incoming email include a valid one-time password could be used to eliminate unsolicited email. In some embodiments, the authentication service could respond with a simple success message that in effect is a generic authentication service identifier for multiple clients, without necessarily providing the authentication service identifier for the email sender. In other embodiments, the authentication service identifier for the email sender may be provided and/or the identity of the email sender may be verified by a fourth party, as described in more detail below with respect to FIGS. 3A-3E.

In an example data encryption embodiment, the sender (e.g., a service provider) has obtained the recipient's (e.g., a client) authentication service identifier from a prior registration. The data to be encrypted could be any type of data, including medical records for a hospital or other provider, tax information from a taxing agency of authority, or other sensitive and/or personal data. The sender encrypts the data by using the recipient's authentication service identifier as a key to the algorithm used, and then emails this encrypted data to the recipient. The recipient accesses the encrypted data in their email client by entering a one-time password in the space provide (separately retrieved via their client moniker), which is configured to automatically retrieve the recipient's authentication service identifier directly to the email client. The authentication service identifier may or may not be encrypted by using this same password as key as added protection. Regardless, the authentication service identifier is then used as the main key to decrypt the data by using built-in software provided for this service. Only the recipient knows their own moniker to retrieve their own authentication service identifier, which is now being used as an single (symmetric) encryption/decryption key.

In another example data encryption embodiment, two users may agree to share a common authentication service identifier to encrypt and decrypt data exchanged between them. Each user may receive the authentication service identifier from the authentication service by providing a shared client moniker (or even distinct monikers linked to the same authentication service identifier) to the authentication service. Note that users can act as both client and service provider, depending on the needs of a particular implementation. Accordingly, use of the labels "client" and "service provider" should be understood to indicate roles played at a given time, which are subject to change and/or which may be played simultaneously, should the need arise.

FIGS. 3A-3E show a flow chart for an example embodiment of one-time password authentication in which certain client information is verified by a trusted entity. As indicated above, the flow chart of FIGS. 3A-3E corresponds to the environment 109 illustrated in FIG. 1B. Like FIGS. 2A-2E, although processing or operations for example embodiments may be described or claimed in a particular order, the present invention is not necessarily limited to any particular ordering or combination.

In general, the client accesses (302) the authentication service in order to obtain a one-time password and provide verified information to a service provider. The authentication service requests (304) a client moniker from the client. As discussed above in connection with FIGS. 2A-2E, the client moniker identifies the client to the authentication service and is analogous to a username or personal password. In response, the client sends (306) the client moniker to the authentication service and requests verification of information by a trusted entity service provider. The authentication service requests (308) the information to verify and the trusted entity that will perform the verification. For this request, the client sends (312) the information to verify and identifies the trusted entity. Typically, the information to verify includes sufficient information to identify the client to the trusted entity. Of course, the client could send to the authentication service the client moniker, information to verify, and identity of the trusted entity with the initial access or in response to the request for the client moniker, and so forth, to simplify the client's interaction with the authentication service.

Upon receiving a client moniker from the client, the authentication service generates (314) a one-time password for the client, associates (316) the one time password with the client moniker and/or authentication service identifier for the client, and sends (318) the one-time password and information to verify to the trusted entity service provider. For purposes of discussing FIGS. 3A-3E, it is assumed that the client is an existing client of the authentication service, that is, the authentication service has previously generated an authentication service identifier for the client and associated the authentication service identifier for the client with the client moniker. Alternatively, client registration with the authentication service, as described above, could occur in connection with generating the one-time password for the client.

At this stage, the authentication service sends the one-time password and information to verify to the trusted entity. The trusted entity determines (322) if there is a valid trusted entity identifier for the client. In other words, prior to verifying client information, the trusted entity determines if the client is known to the trusted entity. If not, processing ends (324). Otherwise, the trusted entity sends (326) the one-time password back to the authentication service.

The authentication service matches (328) the one-time password received from the service provider to one-time passwords that the authentication service considers valid. If the authentication service determines (332) that the received one-time password is not valid, processing ends (330). For a valid one-time password, the authentication service sends (334) the authentication service identifier for the client to the trusted entity. However, unlike the description of FIGS. 2A-2E, the authentication does not discard the one-time password at this time.

Upon receiving the authentication service identifier for the client from the authentication service, the trusted entity matches (336) the authentication service identifier for the client with one previously received and verifies the client information. Here too, it is assumed that the client has been identified to the trusted entity on a previous occasion, that is, the authentication service has previously sent an authentication service identifier for the client to the trusted entity. Alternatively, that identification, as described above, could occur in connection with the matching. If the trusted entity determines (338) that the received the authentication service identifier for the client is not known to the trusted entity, processing ends (342). Otherwise, the trusted entity sends (344) the same one-time password to the authentication service a second time as an indication that the trusted entity has verified the client information.

The authentication service again matches (346) the one-time password received from the trusted to one-time passwords that the authentication service considers valid. If the authentication service determines (348) that the received one-time password is not valid, processing ends (352). For a valid one-time password, the authentication service sends (354) the one-time password and verified client information to a new service provider. The authentication service, however, still does not discard the one-time password.

Upon receiving the one-time password and verified information from the authentication service, the new service provider determines (356) if there is a valid service provider identifier for the client. Once again, it is assumed that the client has been identified to the new service provider on a previous occasion, that is, the new service provider has previously generated a service provider identifier for the client. Alternatively, that identification, as described above, could occur at this time. If so, the service provider sends (362) the one-time password to the authentication service. Otherwise, processing ends (358).

Yet again, the authentication service matches (364) the one-time password received from the service provider to one-time passwords that the authentication service considers valid. Because the authentication service has not discarded the one-time password following previous matches, the one-time password remains valid, unless the one-time password has expired. If the authentication service determines (366) that the received one-time password is not valid, processing ends (368).

For a valid one-time password, the authentication service sends (372) the authentication service identifier for the client to the new service provider and finally discards (not shown) the one-time password so that it is no longer valid. Upon receiving the authentication service identifier for the client, the service provider matches (376) the authentication service identifier for the client that is received (e.g. 372) from the authentication service with an authentication service identifier that the service provider previously associated with the service provider identifier for the client. If the authentication service identifier is valid (378), the service provider accepts (384) the information as verified. Otherwise, processing ends (382).

Having described the Figures generally, FIGS. 3A-3E are now described briefly in the context of a specific example in which the new service provider needs to have the client's zip code verified. Similar to the specific example discussed above in connection with FIGS. 2A-2E, the example uses "BBagley" as a client moniker, "OTPW1" as a one-time password, "xy8923a" as an authentication service identifier for BBagley, "BrianBagley" as a trusted entity identifier for the client, "BrianB" as a service provider identifier for the client, and "84770" as the zip code to verify. At 306, the client provides the moniker BBagley, the trusted entity identifier BrianBagley, the service provider identifier BrianB, and the information to verify, zip code 84770, for the client to the authentication service. BBagley is an existing client, so the authentication service generates (314) a one-time password OTPW1, associates (316) the one-time password with BBagley and/or BBagley's authentication service identifier xy8923a, and sends (318) the one-time password, trusted entity identifier, and zip code to the trusted entity.

At 322, the trusted entity validates the trusted entity identifier and sends the one-time password, OTPW1, back to the authentication service. The authentication service matches (328) the one-time password and sends (334) the authentication service identifier for the client, xy8923a, to the trusted entity. Because BrianBagley is a known client, the trusted entity matches (336) the received authentication service identifier xy8923a with an authentication service identifier that was received previously, such as during an initial interaction to create an account for or register BrianBagley, verifies the zip code, and sends (344) the one-time password back to the authentication service to indicate to the authentication service that the zip code has been verified.

The authentication service matches (346) the one-time password and sends (354) the one-time password, the service provider identifier, BrianB, and the verified information, zip code 84770, to the new service provider. Here too, because BrianB is a known client, the new service provider determines (356) that the service provider identifier is valid and sends (362) the one-time password back to the authentication service. The authentication service matches (364) the one-time password and sends (372) the authentication service identifier for the client, xy8923a, to the new service provider. The new service provider matches (376) the received authentication service identifier xy8923a with an authentication service identifier that was received previously, such as during an initial interaction to create an account for or register BrianB, and accepts (384) the client information, zip code 84770, as verified. Alternatively, the new service provider could simply register the authentication service identifier if no prior registration has occurred.

In a credit card use verification embodiment, the credit card issuer or similar entity (trusted entity service provider) associates a card number with an authentication service identifier during card activation as described above. The card user (client), uses the card number either in person or by computer along with a one-time password. The vendor (service provider) sends the one-time password with the card number to the card issuer, who in turn sends the same one-time password to the authentication service, who then sends the card issuer, or similar entity, the authentication service identifier for the client, if the one-time password is valid. The card issuer then confirms by matching the registered authentication service identifier for the client with the authentication service identifier received from the authentication service. If the authentication service identifiers match, the card issuer sends an agreed upon response to the vendor, which may include forwarding the authentication service identifier for the client.

In yet another example data encryption embodiment, the data sender and data recipient do not have a prior relationship (e.g., the recipient has not previously registered with the sender). The embodiment incorporates the third-to-fourth party embodiment described above in connection with FIGS. 3A-3E, and therefore avoids one traditional approach of sending encrypted data followed later by the decryption key, which is vulnerable to snoopers along the data transmission path. The sender accesses a third-to-fourth party verification option at the authentication service, and identifies themselves as the service provider (fourth party) and the recipient, where the encrypted information is being sent, as the trusted entity service provider (third party).

The sender receives a one-time password from the authentication service and uses it to obtain the authentication service identifier for the sender from the authentication service, which the sender's email client automatically uses to encrypt the data being sent. The sender sends the encrypted email to the recipient, and sends the one-time password to the authentication service provider to initiate verification. Upon receiving the one-time password a second time, sends the same one-time password to the recipient of the encrypted data (third party).

The recipient, therefore, receives both an encrypted email from the sender, and a separate one-time password from the authentication service provider. To decrypt the encrypted data, the recipient sends the one-time password to the authentication service provider, and receives the sender's authentication service identifier, which was used to encrypt the data, from the authentication service provider. Upon receiving the authentication service identifier for the sender, the recipient decrypts the message.

Although the processing may seem like a round-about way to provide the decryption key, it obviates any need for the sender to send a one-time password in a separate email after the email is sent, which would be more straightforward, but less safe since both messages have the same origin and destination. Of course, the processing described above could be performed as a series of manual steps, or could be incorporated into an email client and performed automatically.

It should be appreciated that a single authentication service, client, service provider, and/or trusted entity service provider may be capable of all described embodiments, or alternatively specialized embodiments may be implemented to handle the particular needs or preferences of a particular circumstance. Accordingly, portions of the foregoing embodiments may be combined together, and/or simplified depending on the particular application.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disc drive 430 for reading from or writing to removable optical disc 431 such as a CD-ROM or other optical media. The magnetic hard disk drive 427, magnetic disk drive 428, and optical disc drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disc 431, other types of computer readable media for storing data can be used, including magnetic cassettes, flash memory cards, digital versatile discs, Bernoulli cartridges, RAMs, ROMs, and the like.

Program code means comprising one or more program modules may be stored on the magnetic hard disk 439, removable magnetic disk 429, removable optical disc 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. At an authentication service in a computerized environment that includes a client, a service provider, and an authentication service, a method of the authentication service authenticating the client to the service provider using a one-time password that was previously exchanged between the authentication service and the client, the method comprising the acts of:

the authentication service generating an authentication service identifier for the client;

the authentication service receiving a client moniker from the client;

after receiving the client moniker, the authentication service sending a one-time password to the client for the client to use in accessing the service provider;

after sending the one-time password to the client, the authentication service receiving a one-time password from the service provider;

if the one-time password received from the service provider matches the one-time password sent by the authentication service to the client, then the authentication service sending the authentication service identifier for the client to the service provider to authenticate the client; and if the one-time password received from the service provider does not match the one-time password sent by the authentication service to the client, then the authentication service indicating to the service provider that the one-time password received from the service provider does not match the one-time password sent to the client.

2. A method as recited in claim 1, wherein the one-time password received from the service provider matches the one-time password sent to the client, the method further comprising the authentication service performing an act of discarding the one-time password to limit further use of the one-time password in authenticating the client.

3. A method as recited in claim 1, further comprising the authentication service performing an act of selecting the one-time password sent to the client from a list of random numbers.

4. A method as recited in claim 1, wherein the authentication service generates the authentication service identifier for the client as part of a registration operation during which the authentication service receives the client moniker from the client through a trusted entity that verifies the client's identity.

5. A method as recited in claim 1, wherein the authentication service sends the authentication service identifier for the client to the service provider over a secure connection that authenticates the identity of the authentication service to the service provider.

6. At an authentication service in a computerized environment that includes a client, a service provider, and an authentication service, a computer program storage product comprising one or more computer readable media carrying computer executable instructions that, when executed, cause one or more processors in the authentication service to perform a method of the authentication service authenticating the client to the service provider using a one-time password previously exchanged between the authentication service and the client, the method comprising the authentication service performing acts of:

the authentication service generating an authentication service identifier for the client;

the authentication service receiving a client moniker from the client;

after receiving the client moniker, the authentication service sending a one-time password to the client for use with the service provider;

after sending the one-time password to the client, the authentication service receiving a one-time password from the service provider; and the authentication service identifying that the one-time password received from the service provider matches the one-time password sent by the authentication service to the client; and the authentication service sending the authentication service identifier for the client to the service provider to authenticate the client.

7. A computer program storage product as recited in claim 6, the method further comprising the authentication service performing an act of discarding the one-time password sent to the client to limit further use of the one-time password in authenticating the client after an expiration time.

8. A computer program storage product as recited in claim 6, the method further comprising the authentication service performing an act of generating the one-time password sent to the client using an algorithm for generating random numbers.

9. A computer program storage product as recited in claim 6, wherein the service provider is a trusted entity for authenticating client information to a new service provider, the method further comprising the authentication service performing acts of:

the authentication service receiving client information from the client;

the authentication service sending the client information to the trusted entity provider to authenticate;

the authentication service receiving the one-time password from the trusted entity service provider as an indication that the client information is accurate;

the authentication service sending the client information to the new service provider;

the authentication service receiving the one-time password from the new service provider; and the authentication service sending the authentication service identifier for the client to the new service provider as an indication that the client information is accurate.

10. A computer program storage product as recited in claim 9, the method further comprising an act of the authentication service discarding the one-time password after the one-time password is received from the new service provider.

11. A computer program storage product as recited in claim 9, wherein the service provider is an email recipient.

12. A computer program storage product as recited in claim 9, further comprising an act of sending the authentication service identifier to the client to be used as an encryption key.

13. At a service provider in a computerized environment that includes a client, a service provider, and an authentication service, a method of the service provider authenticating the client through a one-time password previously exchanged between the authentication service and the client, the method comprising the service provider performing acts of:

the service provider associating a prior authentication service identifier for the client with a prior service provider identifier for the client;

the service provider receiving from the client a service provider identifier for the client and a one-time password from the client to use in authenticating the client through the authentication service, wherein the authentication service sent the one-time password to the client in exchange for a client moniker;

the service provider verifying that the service provider identifier received from the client matches the prior service provider identifier, and represents a valid service provider identifier;

the service provider sending the one-time password to the authentication service in order to receive a client authentication service identifier from the authentication service;

identifying that a received authentication service identifier for the client matches the prior authentication service identifier for the client associated with the service provider identifier for the client at the service provider.

14. A method as recited in claim 13, wherein the authentication service identifier for the client is associated with a service provider identifier for the client as part of a registration operation during which the service provider first receives the authentication service identifier for the client in order to make the association.

15. A method as recited in claim 14, wherein the registration operation is conducted in connection with activating a credit card.

16. A method as recited in claim 15, further comprising the service provider performing acts of:

the service provider receiving a credit card number from the client over a telephone connection;

the service provider receiving a registration one-time password from the client over the telephone connection;

the service provider sending the registration one-time password to the authentication service; and the service provider receiving the authentication service identifier for the client to be associated with the service provider identifier for the client from the authentication service.

17. A method as recited in claim 13, further comprising the service provider performing acts of:

the service provider receiving a subsequent authentication service identifier for the client from the authentication service;

identifying that the subsequent authentication service identifier for the client received from the authentication service fails to match the prior authentication service identifier for the client associated with the service provider identifier for the client at the service provider; and the service provider denying the client access to one or more services offered by the service provider.

18. A method as recited in claim 13, wherein no authentication service identifier for the client is received from the authentication service, indicating that no client authentication service identifier is associated with the one-time password at the authentication service.

19. At a service provider in a computerized environment that includes a client, a service provider, and an authentication service, a computer program storage product comprising one or more computer readable media carrying computer executable instructions that, when executed, cause one or more processors in the service provider to perform a method of the service provider authenticating the client through a one-time password previously exchanged between the client and the authentication service, the method comprising the service provider performing acts of:

the service provider associating an authentication service identifier for the client with a prior service provider identifier for the client;

the service provider receiving from the client the service provider identifier for the client and a one-time password from the client to use in authenticating the client through the authentication service, wherein the authentication service sent the one-time password to the client in exchange for a client moniker;

the service provider verifying that the service provider identifier received from the client matches the prior service provider identifier, and represents a valid service provider identifier;

the service provider sending the one-time password to the authentication service in order to receive a client authentication service identifier from the authentication service;

identifying that received authentication service identifier for the client matches the prior authentication service identifier for the client associated with the service provider identifier for the client at the service provider; and the service provider allowing the client access to one or more services offered by the service provider.

20. A computer program storage product as recited in claim 19, wherein the service provider receives the authentication service identifier for the client over a secure connection that authenticates the identity of the service provider to the authentication service.

21. A computer program storage product as recited in claim 19, wherein the one or more services offered by the service provider include electronic voting.

22. A computer program storage product as recited in claim 19, wherein the one or more services offered by the service provider comprise processing electronic mail for one or more electronic mail recipients.

23. A computer program storage product as recited in claim 19, wherein the authentication service identifier comprises a generic authentication service identifier for multiple clients.

24. A computer program storage product as recited in claim 21, wherein the one-time password is received from the client in connection with the client casting an electronic vote, the method further comprising an act of the service provider sending the electronic vote to a vote tallying authority upon identifying that the authentication service identifier for the client received from the authentication service matches the authentication service identifier for the client associated with the service provider identifier for the client at the service provider.

25. A computer program storage product as recited in claim 19, wherein the service provider is a trusted entity for authenticating client information to a new service provider, the method further comprising the trusted entity service provider performing acts of:
  the trusted entity service provider receiving client information to authenticate to the new service provider; and
  the trusted entity service provider sending the one-time password to the authentication service only if the client information accurately corresponds to the received service provider identifier for the client and the authorization service identifier for the client to authenticate to indicate to the authentication service that the client information is accurate.

26. At a client computer system in a computerized environment that includes a client, a service provider, and an authentication service, a computer program storage product comprising one or more computer readable media carrying computer executable instructions that, when executed, cause one or more processors in the client to perform a method of the client authenticating to the service provider using a one-time password previously exchanged between the client and the authentication service, the method comprising the client performing acts of:
  the client sending a client moniker to the authentication service to obtain a one-time password;
  the client receiving the one-time password from the authentication service, wherein the one-time password is associated with an authentication service identifier for the client to use in accessing the service provider;
  the client sending a service provider identifier for the client to the service provider so that the service provider can locate the authentication service identifier for the client that is associated with the service provider identifier for the client at the service provider; and
  the client sending the one-time password previously received from the authentication service to the service provider, whereby the service provider can perform the acts of:
    sending the one-time password to the authentication service;
    upon validating the one-time password by the authentication service, receiving the authentication service identifier for the client that is associated with the one-time password from the authentication service; and
    matching the authentication service identifier for the client that is received from the authentication service with the authentication service identifier for the client that is associated with the service provider identifier for the client at the service provider.

27. A computer program storage product as recited in claim 26, wherein the service provider is part of a password protected file protocol at the client that requests the one-time password in order to grant access to a protected file.

28. A computer program storage product as recited in claim 26, wherein the client sends the one-time password to the service provider over a secure connection that authenticates the identity of the client to the service provider.

29. A computer program storage product as recited in claim 26, the method further comprising the client performing acts of:
  the client receiving a registration one-time password from the authentication service that is associated with the authentication service identifier for the client;
  the client sending the service provider identifier for the client to the service provider in preparation for registering the client with the service provider; and
  the client sending to the service provider the registration one-time password previously exchanged with the authentication service so that the service provider can send the registration one-time password to the authentication service, receive the authentication service identifier for the client from the authentication service, and associate the authentication service identifier for the client that is received from the authentication service with the service provider identifier for the client at the service provider.

* * * * *

UNITED STATES PATENT AND TRADEMARK OFFICE
CERTIFICATE OF CORRECTION

PATENT NO.       : 7,613,919 B2                                          Page 1 of 1
APPLICATION NO.  : 10/963334
DATED            : November 3, 2009
INVENTOR(S)      : Brian B. Bagley It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 777 days.

Signed and Sealed this

Nineteenth Day of October, 2010

David J. Kappos
*Director of the United States Patent and Trademark Office*